(12) United States Patent
Aabye et al.

(10) Patent No.: US 9,582,267 B2
(45) Date of Patent: Feb. 28, 2017

(54) METHODS AND SYSTEMS FOR PARTIAL PERSONALIZATION DURING MOBILE APPLICATION UPDATE

(71) Applicant: Visa International Service Association, San Francisco, CA (US)

(72) Inventors: Christian Aabye, Foster City, CA (US); Kiushan Pirzadeh, Foster City, CA (US); Glenn Powell, Fremont, CA (US); Igor Karpenko, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/882,222

(22) Filed: Oct. 13, 2015

(65) Prior Publication Data

US 2016/0103675 A1 Apr. 14, 2016

Related U.S. Application Data

(60) Provisional application No. 62/062,437, filed on Oct. 10, 2014, provisional application No. 62/076,440, filed on Nov. 6, 2014.

(51) Int. Cl.
*G06F 9/44* (2006.01)
*G06F 9/445* (2006.01)
(Continued)

(52) U.S. Cl.
CPC .................. *G06F 8/68* (2013.01); *G06F 8/71* (2013.01); *G06F 9/4451* (2013.01);
(Continued)

(58) Field of Classification Search
None
See application file for complete search history.

(56) References Cited

U.S. PATENT DOCUMENTS 6,904,611 B1 * 6/2005 Poli ........................... G06F 8/61
348/E5.006
7,080,371 B1 * 7/2006 Arnaiz ...................... G06F 8/65
717/168
(Continued)

OTHER PUBLICATIONS

International Search Report and Written Opinion mailed Feb. 1, 2016, PCT/US2015/055397 filed Oct. 13, 2015, 9 pages.

*Primary Examiner* — Tuan Q. Dam
*Assistant Examiner* — Zheng Wei
(74) *Attorney, Agent, or Firm* — Kilpatrick Townsend & Stockton LLP

(57) ABSTRACT

Embodiments of the present invention are directed at methods and systems for providing a partial personalization process that allows for more efficient and effective personalization of a mobile application on a communication device after updating the mobile application. For example, personalization profiles associated with multiple versions of the mobile application may be stored at an application update provisioning system and the application update provisioning system may determine the appropriate partial provisioning information to update the mobile application for each migration notification. Accordingly, a tailored partial personalization script including only that personalization information that is to be updated for the updated version of the mobile application may be generated and installed to enable new functionality and/or update the information contained within an updated mobile application, without requiring re-personalization of all personalized information into the updated mobile application.

18 Claims, 5 Drawing Sheets

(51) Int. Cl.
   *H04L 29/08*    (2006.01)
   *H04W 12/04*    (2009.01)
   *H04W 4/00*     (2009.01)
   *H04W 12/10*    (2009.01)

(52) U.S. Cl.
   CPC ........... *H04L 67/306* (2013.01); *H04W 12/04* (2013.01); *H04W 4/001* (2013.01); *H04W 12/10* (2013.01)

(56) References Cited

U.S. PATENT DOCUMENTS

| | | | | |
|---|---|---|---|---|
| 7,146,412 | B2* | 12/2006 | Turnbull | G06F 8/65 709/206 |
| 7,669,196 | B2* | 2/2010 | Takizawa | G06F 8/65 358/1.14 |
| 7,877,746 | B2* | 1/2011 | Kahan | G06F 8/60 717/168 |
| 8,245,219 | B2* | 8/2012 | Agarwal | G06F 8/65 717/168 |
| 8,516,475 | B2* | 8/2013 | Akiyoshi | G06F 8/60 358/1.1 |
| 8,661,429 | B2* | 2/2014 | Ruster | G06F 8/65 717/173 |
| 8,745,613 | B2* | 6/2014 | Bambach | H04L 41/082 709/203 |
| 8,819,664 | B2* | 8/2014 | Holmberg | G06F 8/665 717/168 |
| 2002/0124243 | A1* | 9/2002 | Broeksteeg | G06F 8/65 717/168 |
| 2002/0140966 | A1* | 10/2002 | Meade, II | G06F 9/4415 358/1.15 |
| 2002/0144254 | A1* | 10/2002 | Owada | G06F 8/68 717/171 |
| 2005/0257210 | A1* | 11/2005 | Stienhans | G06F 9/44505 717/170 |
| 2006/0151592 | A1* | 7/2006 | Poor | G06Q 30/02 235/375 |
| 2008/0077915 | A1* | 3/2008 | Kahan | G06F 8/60 717/178 |
| 2008/0148251 | A1* | 6/2008 | Yang | G06F 8/665 717/171 |
| 2008/0263538 | A1* | 10/2008 | Bando | G06F 8/65 717/171 |
| 2009/0100420 | A1* | 4/2009 | Sapuntzakis | G06F 8/65 717/171 |
| 2010/0162231 | A1* | 6/2010 | Lanchares | G06F 8/60 717/177 |
| 2010/0175115 | A1 | 7/2010 | Choi et al. | |
| 2011/0126183 | A1 | 5/2011 | Bernard et al. | |
| 2011/0307278 | A1 | 12/2011 | Clarke et al. | |
| 2012/0131566 | A1 | 5/2012 | Morgan et al. | |
| 2013/0103790 | A1 | 4/2013 | Gupta et al. | |
| 2014/0019955 | A1* | 1/2014 | Summerer | G06F 21/57 717/171 |
| 2014/0189674 | A1* | 7/2014 | Nagao | G06F 8/68 717/170 |
| 2014/0214655 | A1 | 7/2014 | Smith | |
| 2014/0244482 | A1 | 8/2014 | Joa et al. | |
| 2014/0351806 | A1* | 11/2014 | Gargiulo | G06F 8/65 717/170 |
| 2015/0073996 | A1 | 3/2015 | Makhotin et al. | |
| 2015/0100955 | A1* | 4/2015 | Chen | G06F 8/65 717/170 |
| 2015/0178067 | A1* | 6/2015 | Ji | G01C 21/36 717/170 |
| 2015/0199194 | A1* | 7/2015 | Niwa | G06F 8/665 717/170 |
| 2016/0092194 | A1* | 3/2016 | Chhatwal | G06F 8/65 717/170 |
| 2016/0110183 | A1* | 4/2016 | Fu | G06F 9/44 717/169 |

\* cited by examiner

METHODS AND SYSTEMS FOR PARTIAL PERSONALIZATION DURING MOBILE APPLICATION UPDATE

CROSS-REFERENCES TO RELATED CASES

This application is a non-provisional of and claims the benefit of priority to U.S. Provisional Application No. 62/062,437, filed Oct. 10, 2014, and U.S. Provisional Application No. 62/076,440, filed Nov. 6, 2014, which are both hereby incorporated by reference in their entirety for all purposes.

BACKGROUND

Mobile payment environments typically use mobile payment applications with personalized financial and personal information installed in a communication device to perform transactions using the communication device. The personalized information may contain sensitive account and personal information about an accountholder associated with the communication device. The personalized information may be used to allow the communication device to pass payment information (e.g., account credentials) to a merchant, access device, or any other entity in order to initiate and process a transaction. Typically the personalization information is provisioned to the device through an account provisioning process involving user authentication and agreement to provision the personalized information on the communication device. The user authentication may require a user to provide particular passcodes, one-time passwords, or any other authentication credentials to ensure an issuer and/or provisioning system that the consumer is authorized to obtain the account information on the requesting device. Accordingly, a consumer may be required to interact with a device during provisioning in order to authenticate themselves to entities within the provisioning system before an account may be provisioned to a communication device.

However, when new versions of mobile applications are available to a communication device, it may be inconvenient and inefficient to re-personalize the sensitive account information to the communication device after updating the mobile payment application or mobile application. The re-personalization may lead to heavy network traffic, delays, and lower throughput when large numbers of application updates are occurring at the same time. For example, mobile device manufacturers and application providers may release a new update to all of their users at the same time which may lead to millions of updates in a short amount of time. Accordingly, there is a need to provide application updating and migration processes without requiring a full re-personalization of a mobile application.

Embodiments of the invention address these and other problems, individually and collectively.

SUMMARY

Embodiments are directed to a partial personalization process that allows for more efficient and effective personalization of a mobile application and/or other applications on a communication device after migration or updating versions of the mobile applications. For example, personalization profiles associated with multiple versions of the mobile application may be stored at a provisioning system and a provisioning system may determine the appropriate partial provisioning information to update the functionality on the mobile application for each specific provisioning request. Accordingly, a tailored partial personalization script may be generated for each provisioning request including only that information that is to be updated in order to allow the new functionality, security update, and/or updated information to be used by the mobile application.

Thus, the personalization process does not require as much information and/or processing for each update to the mobile application. As such, the partial personalization process allows for higher throughput of personalization updates during high traffic periods of application updates. Further, the risk of fraud is much smaller during updates because the device has already been provisioned previously (and the user has already been authenticated as part of the provisioning process) so a full personalization process including consumer authentication is not necessary to update the mobile application. Accordingly, because the risk of fraud is smaller, some embodiments may initiate the partial personalization process without notifying a user and/or obtaining authentication credentials from the user for the partial personalization of the updated mobile application.

One embodiment of the present invention is directed to a method for updating personalization information associated with an updated mobile application on a communication device. The method comprising receiving a migration notification from the application provider computer. The migration notification including device identification information, applet identification information, and application version information for a mobile application installed on the communication device by the application provider computer. The method may further comprise identifying an account associated with the migration notification using the device identification information and the applet identification information, identifying a current personalization profile associated with the mobile application using the received application version information, identifying an updated personalization profile associated with the updated mobile application, and determining partial personalization information associated with a difference between the current personalization profile and the updated personalization profile. The method may further comprise generating partial personalization scripts including the partial personalization information for updating the personalization information stored in the mobile application of the communication device and providing the partial personalization scripts to the application provider computer for installation on the communication device.

Another embodiment of the present invention is directed to a server computer comprising a processor and a computer-readable medium coupled to the processor. The computer-readable medium comprising code, executable by the processor, to perform a method for updating personalization information associated with an updated mobile application on a communication device. The method comprising a server computer receiving a migration notification from the application provider computer. The migration notification may include device identification information, applet identification information, and application version information for a mobile application installed on the communication device by the application provider computer. The method may further comprise identifying an account associated with the migration notification using the device identification information and the applet identification information, identifying a current personalization profile associated with the mobile application using the received application version information, identifying an updated personalization profile associated with the updated mobile application, and determining partial personalization information associated with a difference between the current personalization profile and the updated personalization profile. The method may further comprise generating partial personalization scripts including the partial personalization information for updating the personalization information stored in the mobile application of the communication device and providing the partial personalization scripts to the application provider computer for installation on the communication device.

These and other embodiments of the invention are described in further detail below.

DETAILED DESCRIPTION

Figure 1:
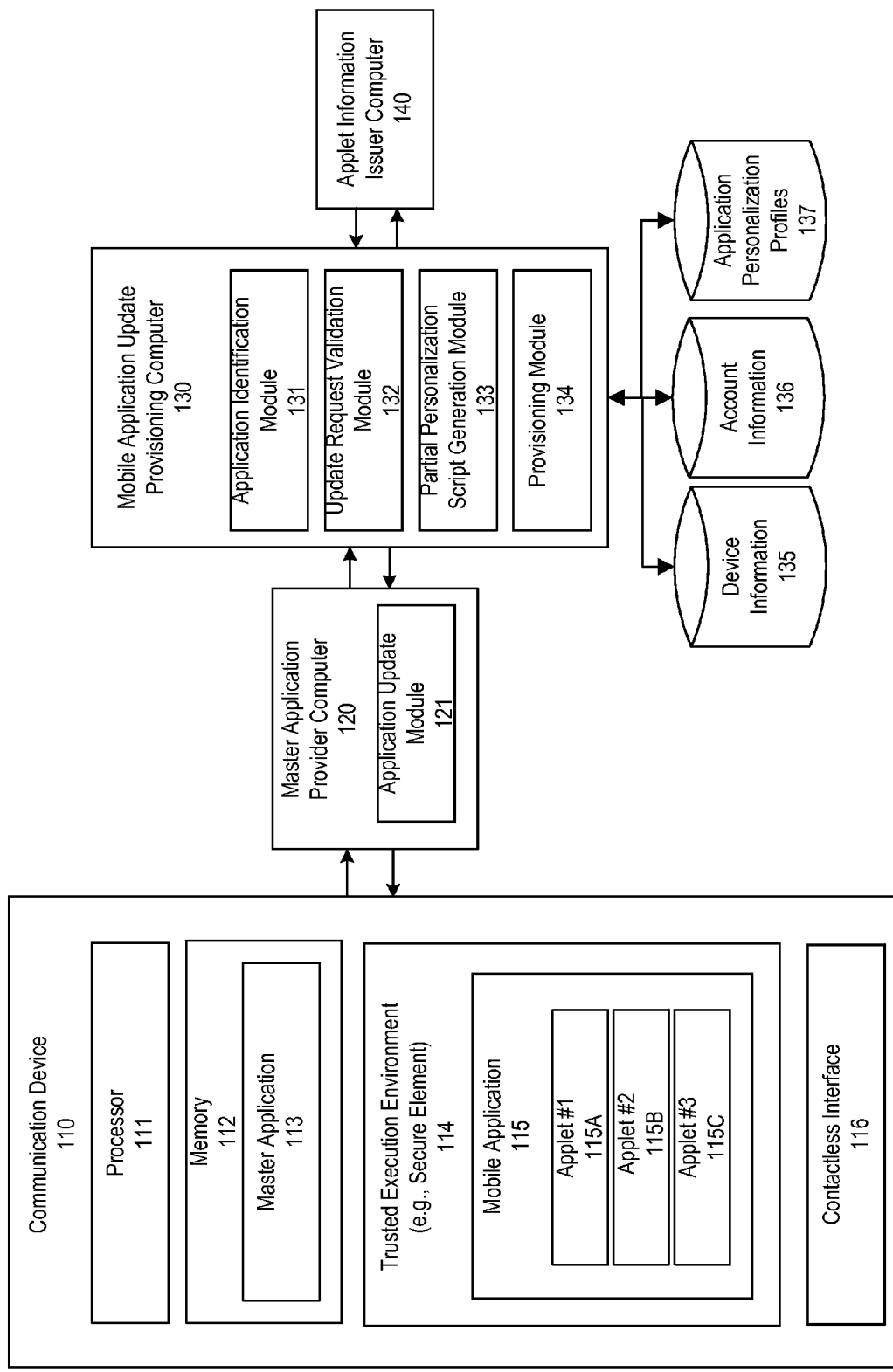
FIG. 1 shows an exemplary block diagram of a partial personalization provisioning system, according to embodiments of the present invention.

Embodiments are directed to a partial personalization process that allows for more efficient and effective personalization of a mobile application on a communication device after migration or updating of a version of a mobile application on a communication device. For example, when migrating to a new version of a mobile application (e.g., a mobile payment application including payment credentials) on a communication device, a master application (e.g., a mobile wallet application configured to interface with the mobile payment application) and a corresponding master application provider (e.g., a mobile wallet application provider) may collect information regarding a previous version of the mobile application and a version of the mobile application that is being migrated or updated to, as well as information to identify a device and a particular application or applet on the device. The mobile application version information, device information, and applet identification information may be transmitted to a mobile application update provisioning system for updating of the personalization information that is installed in the mobile application of the communication device. The application update provisioning system may identify the account, validate the application update, and generate scripts including new personalization information associated with the difference between the previous and updated version of the mobile application. The provisioning scripts may include the difference or delta between personalization information of the different application versions for installation on the communication device.

In some embodiments, the mobile application may be suspended or particular functionality of the mobile application may be suspended (based on the importance of the partial provisioning information) until the partial provisioning scripts are installed on the communication device. Accordingly, the mobile application may be in an inactive state until the partial personalization scripts are installed on the communication device. Alternatively, in some embodiments, only the updated functionality associated with the updated mobile application may be disabled until the partial personalization scripts are installed on the communication device and the previous mobile application functionality may continue to operate.

Typically, mobile applications may be provisioned into a communication device without any personal or account information and a user may thereafter, "personalize" or load their personal information into the mobile application. For example, for mobile payment applications used in mobile payment systems, the mobile payment application may be provisioned into a trusted execution environment (e.g., secure element) of a communication device without any account or other user-specific information for the user of a device. Accordingly, in order for a mobile payment application to have account information or other personal information of a user installed into the mobile payment application, and thus allow the mobile payment application to be used in a transaction, the mobile payment application may be provisioned with account information (e.g., account credentials, expiration date, etc.) and/or other user-specific information (e.g., an application-specific encryption key, etc.).

However, when a new version of a mobile application is updated on the trusted execution environment (e.g., secure element) of the communication device, new personalization information may be necessary for the new version of the mobile application to operate or for new functionality of the updated mobile application to operate. For example, a new cryptographic key may be used to access a transit network (e.g., a subway system) that the mobile application previously was not configured to support, new data formats may be used for existing personalization information within the previous version of the application, a security issue may be identified in the application and new personalization data may be needed for the security update, and/or the application may now need a PIN that previously was not used by the mobile application.

Accordingly, in some embodiments of the present invention, during updates to the mobile application, the personalization information provisioned into the mobile device may be saved and applied using a migration feature to take existing personalization data from the previously installed and personalized applet and use it for the new version of the mobile application. Accordingly, the data may be exported to a temporary storage area within the trusted execution environment, the existing mobile application data may be deleted, the new version of the mobile application may be installed, and the personalization data may be re-installed into the updated mobile application. All of these functions may be completed without performing a re-personalization process.

However, where the mobile application needs new personalization data for a new function, a security update, or any other reason, a new data storage area may be created within the mobile application that may be used by the updated version of the mobile application. Default data (or no data) may be installed into the updated version of the mobile application when the mobile application does not yet have access to the new personalization information. The new data storage area within the mobile application may then be only partially personalized with the new data that is required to allow the new functionality to work. Accordingly, the mobile application may generate a personalization data storage container for the new personalization data (whether it is filled with a default value or not), so the updated version of the mobile application can accept personalization data elements provided for the new storage area through a partial personalization process. Before the new data storage area has been personalized, the applet may be considered in a state that is "partly personalized" or "partially personalized."

For example, a mobile application may be updated to include new transportation application payment functionality that may include some transport-specific information (e.g., a transportation specific encryption key for communicating during NFC transactions with a transportation kiosk or entry point) that may need to be updated in the mobile application. The mobile application may be updated with a newly installed version (either with or without the user's knowledge) and the new key data portion may be left empty upon the installation of the new mobile application version. Accordingly, if a user desires to obtain the requisite functionality for the mobile application, the user may be prompted to start a partial personalization process through the application.

The update may take place as part of an operating system update, a service pack update, or otherwise may be included as part of a broader installation of other software outside of the mobile application. Alternatively, the mobile application may be updated independently of other software on the mobile device.

In some embodiments, after the mobile application is updated, the user may be informed of the update and prompted for the user to initiate a partial personalization process or otherwise update the personalization information stored on the mobile device. The user may accept the update by selecting an update button and an event notification or other notification message may be passed to the master application to inform the provisioning system of the update. In some embodiments, no user prompting may occur and instead, the master application provider or the communication device operating system provider may provide notification of the update to the provisioning system explicit user agreement. Either way, the provisioning system may be sent a migration notification including information identifying the account, device, the previous version of the mobile application installed on the device, and the updated version of the mobile application on the device in order to initiate the partial personalization process.

Depending on the severity and importance of the mobile application update, different effects on the mobile application may be implemented during the update. For example, where important and necessary changes are included (e.g., security issue) that requires new data on the mobile application, the mobile application may be decommissioned or suspended until the new data elements are provisioned onto the mobile application. Alternatively and/or additionally, where the changes are not necessary for operation and may affect only a particular feature of the mobile application, the new functionality or feature may be disabled but the existing mobile payment information functionality may be allowed to continue to operate. If a user desires access to the new features, the user may select an update button, or otherwise provide agreement for the partial personalization process to be initiated.

In this example, the transportation functionality may be de-commissioned, suspended, or otherwise not available until the partial personalization process is completed. However, in other examples, where the information is of higher importance (e.g., a security fix), the mobile application may be suspended altogether until a consumer initiates the provisioning process. Accordingly, the consumer may explicitly request for the re-personalization or the device may obtain the information automatically and the mobile application may collect and transmit a migration notification (or other partial personalization request message) to the master application, the master application provider, and the application update personalization system as described in further detail herein.

Another example of such an update includes offline data authentication which may be used for transportation agencies or other entities that may desire to perform a transaction with a device while offline or not in communication with a central database, payment processing network, or other backend infrastructure for authorizing and/or authenticating a transaction. For instance, a mobile application may be updated with functionality to allow such offline data authentication processes for some systems. However, after the application is update, personalization of the mobile application may be used to install special account-specific and/or agency-specific encryption keys and additional records necessary for processing offline authorization transactions using a particular transit agency. Any other exemplary uses and/or situations where updating information on a mobile application without full re-personalization is desirable may be implemented using embodiments of the present invention.

Accordingly, in order to provide the partial personalization, an application update provisioning system may identify a version of the mobile application that is currently installed (after updating the mobile application) as well as the previous version of the mobile application that was installed (before updating the mobile application). The provisioning system may then determine a delta or difference in personalization information between the two versions to ensure that duplicate information is not delivered to the mobile device for personalization. Thus, the provisioning system may determine what personalization information to update between version x to version y, and may determine that data elements z should be updated in order to complete the functionality. Therefore, if version updates were missed by a user, the partial personalization information may include updates across multiple different versions of a mobile application.

After migration to the updated mobile application, the mobile application may communicate with a master application to allow the master application to get information necessary to initiate the partial personalization process. The mobile application may provide state information to inform the master application that the mobile application needs additional personalization information to operate correctly. A master application may provide a button or other consumer facing interface that allows a user to request provisioning of the personalization information from the master application.

The master application may then collect the device identifier, application identifier, and application version information from the mobile application and transmit a partial personalization request to the application update provisioning system. Thus, the master application may determine a previous version of the applet, an updated version of the applet, obtain any additional data for determining the account associated with the mobile application, and send the partial personalization request (also referred to as a migration notification) to the application update provisioning system to generate the scripts associated with the partial personalization, and the data necessary to start the re-personalization. Accordingly, in some embodiments, an account holder or user of the communication device may not have to provide any personal information, card information, etc. in order to complete the updated personalization process.

Embodiments provide a number of advantages. For example, embodiments provide more efficient use of system resources because duplicative information is not re-provisioned onto a communication device after an update of an application. Additionally, embodiments provide multiple methods for identification and provisioning of payment information without requiring direct communication with a mobile application on a device such that third party personalization systems may be used with controlled device ecosystems.

Moreover, users may update their applications at different times and may miss multiple update cycles without installing new software on their devices. As such, the updated personalization information may not broadcast out to all communication devices because different versions of the applications may be installed on different mobile devices and different personalization information may be needed in different versions of a mobile application between updates. Thus, embodiments allow users to update the functionality of the mobile application at their discretion while providing efficient methods for personalizing information into the mobile applications as necessary.

Before discussing specific embodiments and examples, some descriptions of terms used herein are provided below.

An "application" may include any software module or modules configured to perform specific functions when executed by a processor of a computer. For example, a "mobile application" may include any software that is installed on a mobile device or communication device. In some embodiments, the mobile application may include a mobile payment application that is configured to store and provide payment information for a transaction when executed by a processor. For instance, a payment application may store sensitive payment information (e.g., account identifier, expiration date, card verification value (CVV), etc.) on a secure memory or trusted execution environment (e.g., secure element). The sensitive payment information may be accessed by requesting the payment information from the payment application using an application identifier or other address information for accessing the correct applet of the mobile payment application. Any number of communication protocols may be used to access the applet including the payment information from the payment application and use the received payment information in a payment transaction.

"Personalization information" (also referred to as "perso data" or "perso information") includes individualized information for an account, entity, and/or user. Applications may be "personalized" to include account-specific information personalization information associated with a user. Applications that require personalized information may not operate until the application is personalized with personalization data. For example, personalization information may include the payment information described above as well as any other cryptographic key, a credential (e.g., a token and/or account identifier), information related to cardholder verification methods (e.g., PIN, passcode, shared secret, etc.), personal information (e.g., name, address, etc.), account information (e.g., expiration date, card verification values (CVV), etc.), or any other relevant information associated with an account and/or account holder that may be useful during a transaction. For instance, personalization information may include an application identifier of a co-residing applet, a private key identifier, a private key, an electronic commerce indicator (ECI), a token requestor identifier, a token expiration date, issuer application data including a wallet provider identifier and a card verification results (CVR), card additional processes (CAP), and contactless registry service (CRS) data.

A "personalization profile" may include a set of data that is used to personalize an application. The personalization profile may inform a system of the type of information to obtain in order to personalize an application for a particular user, account, or entity. A "current personalization profile" may include the information that is currently and/or previously personalized into an application. An "updated personalization profile" may include information that is to be personalized into an updated application in order to allow the application to function correctly. In some embodiments, personalization profiles include the type of information to personalize for each profile and the personalization profile may be used to identify the type of information to obtain from a user's account or a system in order to personalize an application. The system may then obtain the corresponding personalization information for the particular account and generate a personalization script including the personalization data for installation on the communication device.

A "script" is a program or sequence of instructions that is interpreted or carried out by another program rather than by a computer processor (as a compiled program is). Thus, a personalization scripts include a sequence of instructions for personalization of a mobile application, other program, or memory on a device.

I. Exemplary Systems for Partial Personalization During Mobile Application Update FIG. 1 shows a block diagram of a partial personalization provisioning system, according to embodiments of the present invention. The partial personalization provisioning system 100 may comprise a communication device 110, a master application 113 provider computer 120, a mobile application update provisioning system 130, and an applet information issuer computer 140. Each of the entities may be configured to communicate with one another using one or more communication networks and any suitable communication protocols.

The communication device 110 may comprise a processor 111, a computer-readable memory 112 including a master application 113 (e.g., a mobile wallet application), a contactless interface 116, and a trusted execution environment 114 including a mobile application 115 that is securely stored in the trusted execution environment 114. The mobile application 115 may include multiple applets (e.g., applet #1-#3 115A-115C) that store data accessible by the mobile application for a variety of different accounts, access right credentials, and/or any other application data. The communication device (e.g., mobile device) 110 may include any electronic device that is configured to receive and store secure data. For example, the communication device may be in the form of a mobile phone, a tablet, a watch, glasses, bracelet, lanyard or other wearable device, and/or any other portable device with a memory, communication components, and a processor.

The trusted execution environment 114 may include a separate hardware secure element with a separate processor from the communication device or may include a software based cryptographically secure memory area of the communication device. Additionally, in some embodiments, the trusted execution environment may be cloud-based or otherwise hosted on a remote server computer with secure information passed to the communication device (e.g., mobile device). The trusted execution environment may have specific security standards and processes for limiting access to the information stored on the trusted execution environment. For example, each application within the trusted execution environment may require a specific encryption key in order to alter and/or update information on the trusted execution environment. For instance, a secure element key may be used to access security domains within the trusted execution environment and/or a specific access key may be used to authenticate access rights for installation before a script is allowed to be installed on a trusted execution environment. In some embodiments, a provisioning key may be stored at a trusted service manager (i.e., provisioning system) and used to generate scripts for installation on the secure domain. In other embodiments, a key stored on the mobile device and/or at an issuer may be used to access and alter information within the mobile application on the trusted execution environment. Embodiments may use any secure transaction infrastructure to generate personalization scripts and access a trusted execution environment to personalize the mobile application on the trusted execution environment.

A master application 113 may include an application that is an interface to the mobile application and controls the operation and access rights of the mobile application. For example, in a mobile payment ecosystem, a master application 113 may include a wallet application that is configured to interface with one or more different payment applications provided by different payment application providers. Further, the master application 113 may interface with multiple different types of mobile applications associated with different issuers and/or application providers. For example, some mobile applications may be configured for mobile payments while other mobile applications may be configured to provide user authentication or access rights (e.g., an airplane application that provides ticket information, a secure area access application that provides credentials for accessing a secure area, etc.).

The master application 113 may be configured to control the update and provisioning of mobile applications on the communication device and may act as an interface for one or more entities that desire to control one or more different mobile applications on the communication device. The master application 113 may be configured to communicate directly with the one or more mobile applications and obtain data from the applets stored within the mobile application. Additionally, the master application 113 may be configured to obtain access rights to the trusted execution environment and alter information within the trusted execution environment as well as install provisioning scripts and/or instructions for altering one or more applications present on a trusted execution environment. Furthermore, in some embodiments, the master application 113 may be present in the trusted execution environment and may be accessed using the secure encryption keys and processes used to secure the trusted execution environment.

A mobile application may include any application that is configured to transmit information for a transaction. The transaction may be for payment, secure access, authentication of user credentials, and/or any other suitable use of secure data on a device. For example, the mobile application may be a mobile payment application that stores user credentials for a transaction. The mobile application may be configured to include multiple applets (e.g., Applet #1-Applet #3) that are associated with different types or different instances of information. Each applet may have a different application identifier (AID) that may be used to identify the particular instances present in the mobile application and allow devices to select one or more of the instances to use during a transaction.

An applet may include a specific instance of the mobile application including data associated with a single or multiple accounts. Each applet may be identified using a separate application identifier (e.g., AID) to identify the specific information that is being requested and/or accessed for a transaction. The applets may include different types of data (e.g., payment data, access rights information, authentication information, etc.) or the same type of data but associated with different accounts (e.g., applet #1 may be associated with a first issuer while applet #2 is associated with a second issuer).

A contactless interface 116 may include hardware and/or software components that allow the mobile device to communicate with external devices through contactless communication protocols. For example, the mobile application may be configured to provide applet information from an identified applet stored within the mobile application to the contactless interface which passes the applet information to a contactless point of sale device and/or remote server computer during a transaction. The contactless interface may be configured to communicate with devices using near-field communication (NFC) protocols, Wi-Fi protocols, Bluetooth™, and/or any other wireless communication protocols to receive, process, and transmit information between the communication device and access devices for transactions. Access devices (not shown) may include point-of-sale terminals, mobile devices, building access devices, and/or any other terminal or device configured to receive authentication credentials and/or information from the mobile application to process a transaction (e.g., payments, access rights, or any other communication of information between entities).

The master application provider computer 120 may include any server computer that may manage, facilitate, and otherwise interact with mobile devices, mobile wallets, and a provisioning computer in order to manage the use and maintenance of a master application 113 that interfaces with a mobile application on the communication device. For example, in some embodiments, the master application 113 may include a wallet application that is configured to manage interactions between the mobile application and the mobile application update computer, applet information issuer computer, and any other relevant entities in a mobile payment ecosystem. In some embodiments, the master application provider computer 120 may comprise a secure element trusted service manager (SE TSM) for devices associated with the wallet provider and wallet provider management functions.

Figure 4:
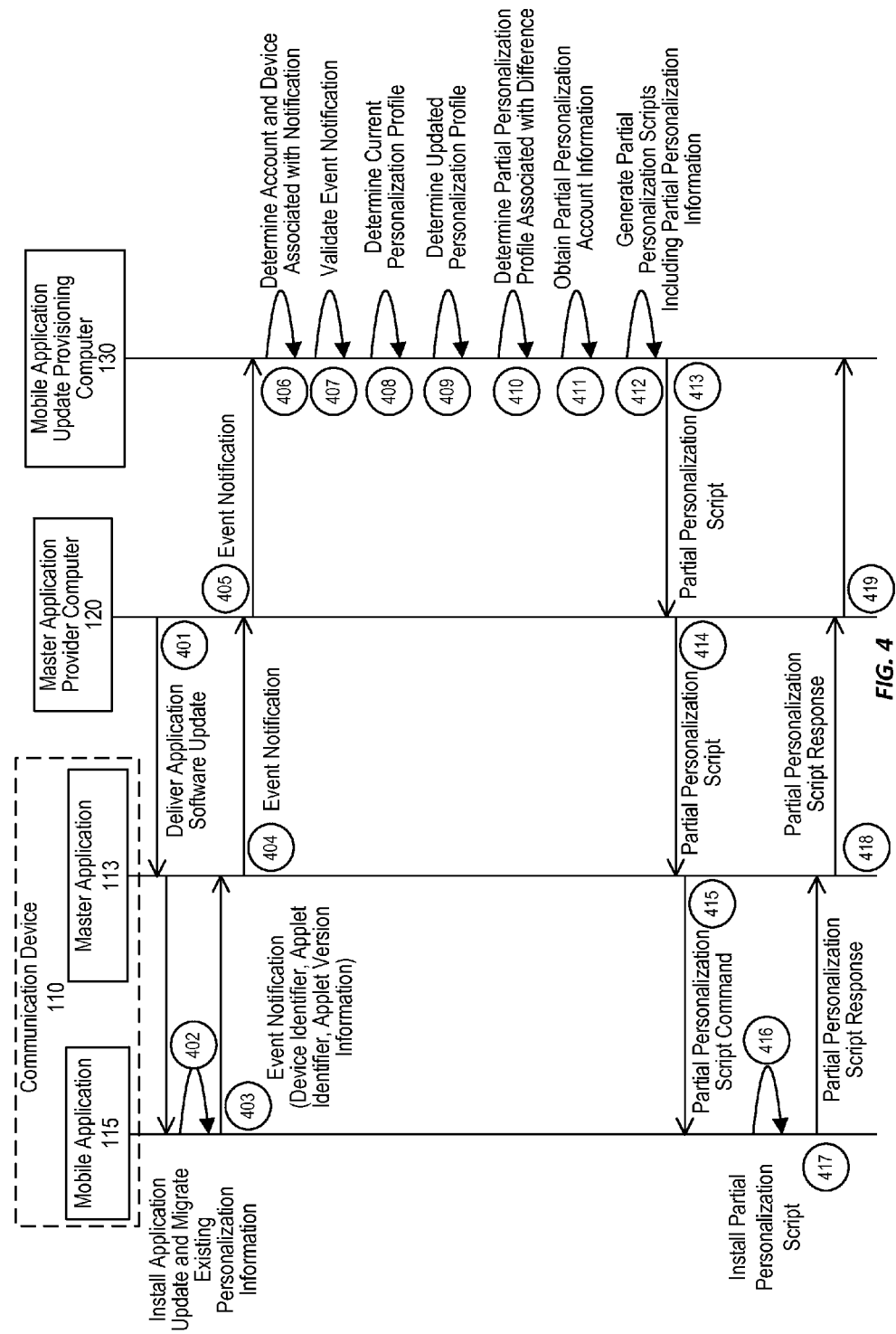
FIG. 4 shows another exemplary flow diagram for a partial personalization provisioning process after update of a mobile application using a provisioning key stored in a provisioning system, according to embodiments of the present invention.
Figure 5:
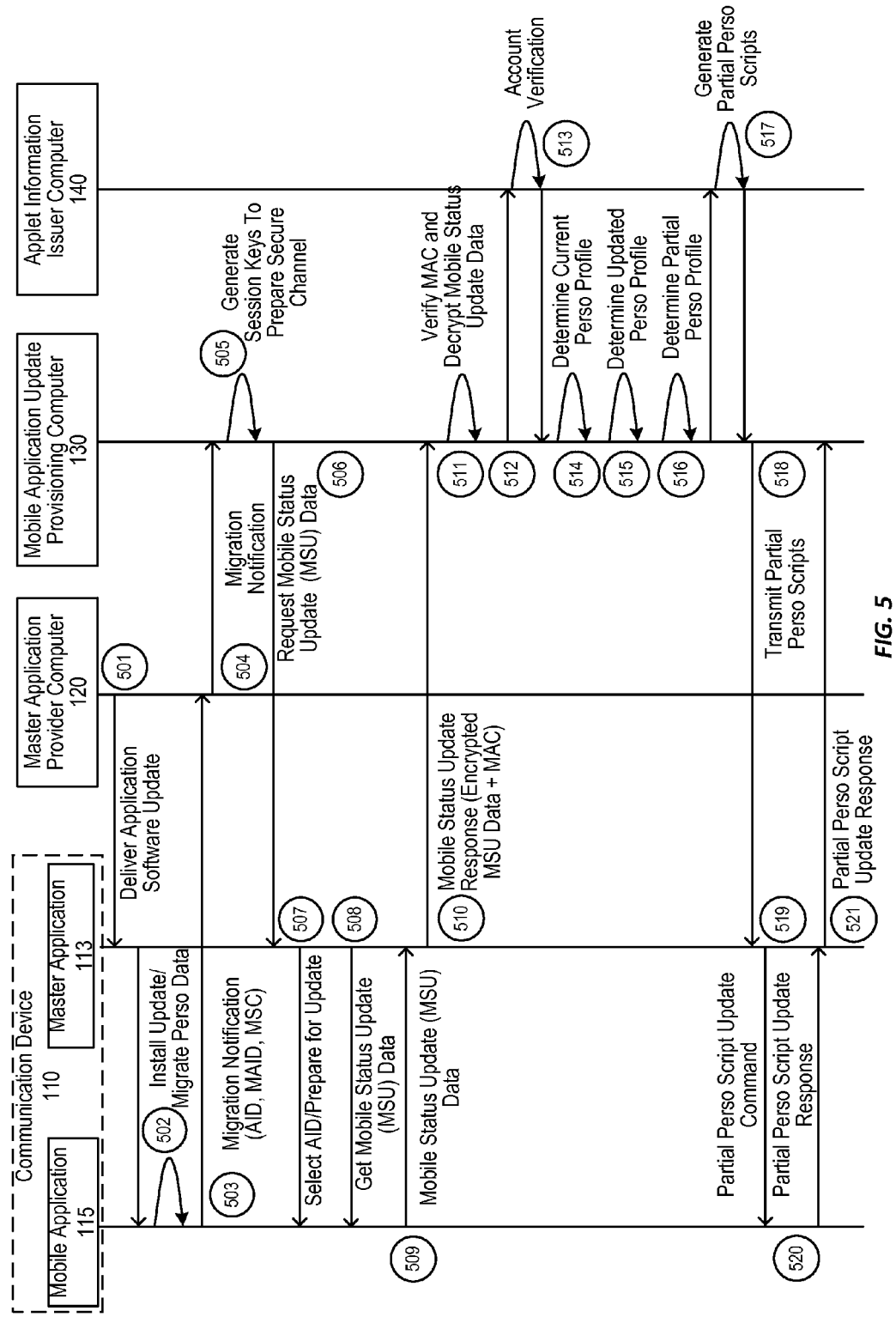
FIG. 5 shows an exemplary flow diagram for a partial personalization provisioning process using an encryption key stored on the communication device and an applet issuer computer, according to embodiments of the present invention.

The master application provider computer 120 may include an application update module 121 that is configured to provide application updates to the master application 113 and the mobile application on the communication device. For example, the master application provider computer may deliver mobile application updates that are provided by the mobile application update provisioning computer 130 and/or a third party application provider for update on the communication device. Further, the application update module 121 of the master application provider may be configured to operate as a central interface point for partial personalization communications between the communication device and the mobile application update provisioning computer 130 and/or a payment processing network provisioning system (not shown but may be integral with the provisioning computer 130). As such, in some embodiments, the messages shown in FIGS. 4-5 are passed through the master application provider computer which manages the interactions between the mobile application update provisioning computer 130 and the mobile application 115 of the communication device 110.

The mobile application update provisioning computer 130 may include any system with access to a user's account information and access to encryption keys for accessing a trusted execution environment on a communication device. For example, a mobile application provisioning computer may include a service provider trusted service manager (TSM) system 130 that may be configured to generate installation scripts for accessing a mobile application and a corresponding applet on a communication device. Because the mobile application update provisioning computer 130 is responsible for generating the personalization data for the updated mobile application, it may also be referred to as a mobile application update personalization computer.

The mobile application update provisioning system 130 may include an application identification module 131, an update request validation module 132, a partial provisioning script generation module 133, and a provisioning module 134. The modules may communicate information to one another related to application update notification and partial personalization script generation process and may access the device information, account information, and application personalization profiles for completing the partial personalization processes described herein. The functionality of each module is described in further detail below in reference to the flow diagrams of FIGS. 2-6.

Additionally, the mobile application update provisioning computer 130 may have access to a device information database 135, account information database 136, and an application personalization profiles database 137. The device information database 135 may include any device identifiers (e.g., mobile subscriber identifier (MSID), manufacturer's serial number, secure element identifiers, or any other persistent or semi-persistent device identifier) that can be used to identify a registered and/or previously provisioned communication device. The device information database 135 may also be associated with account information in the account information database 136 such that once a mobile device and/or secure element is identified for a request, accounts associated with the identified communication device are identified. For example, the device information database 135 may include application identifiers for applets that have been provisioned through the mobile application and/or installed on the communication device.

The account information database 136 may include any account information associated with a user and/or applet information issuer that is configured to be personalized by the mobile application update provisioning computer. For example, the account information database 136 may include any information associated with a particular user and/or issuer account. For instance, the account information database 136 may include historical provisioning information and/or personalization information associated with each applet of the mobile application (e.g., application version, date, time, etc.). Further, the account information database 136 may include any account specific information that may be used to personalize a mobile application. For instance, in some embodiments, the account information database 136 may include an account specific encryption key that may be used during provisioning, an account-specific encryption key that may be used for secure communication with a mobile application (e.g., secure channel generation), account-specific applet and/or mobile application encryption keys to be installed on a mobile application for use during a transaction, user and/or account information to be personalized into an applet of the mobile application, authentication credentials and/or shared secrets (e.g., PIN, etc.) that may be used during transactions, etc.

The application personalization profiles database 137 of the application update provisioning system 130 may manage version specific personalization profiles for the mobile application which may be used to determine the specific partial personalization information to include in a script for each subsequent mobile application update process. For example, a mobile application version number may be obtained for each partial personalization request because it may be possible that a mobile application is out of date. For instance, an application may jump two or three versions and the difference in the partial personalization information may change for each version request depending on the mobile application version that is being updated from. Accordingly, the partial personalization script generation module of the provisioning system may determine the current personalization information associated with a previous version of the mobile application and the updated personalization information associated with the updated version of the mobile application and determine the differences between the two versions to determine the partial personalization information to include in one or more personalization scripts. These various differences may be referred to as specific personalization profiles associated with each potential combination of personalization updates. An application update provisioning system may know which personalization script to generate and which features to activate for a particular device depending on the version profiles and tailor the personalization scripts to only affect those areas of the mobile application that need to be changed during partial personalization.

Accordingly, the application update provisioning system could include multiple different types of partial personalization scripts for any version of mobile application such that the provisioning system is backward compatible with any number of previous versions of mobile applications. Accordingly, a different partial provisioning script may be needed for each application update from a previous version as well as for updates where a full personalization is necessary due to no previous personalization being completed on a mobile application. So, for example, if there were 3 versions of a mobile application including version 1, 1.1, and 2, the application personalization profiles database 137 may store a different full personalization profile for each version (e.g., where no personalization was previously completed) as well as partial personalization scripts for each potential update that is possible from the previous personalization profiles. For example, the application personalization profiles database 137 may include a different partial personalization profile for upgrading the personalization information from version 1 to 1.1, version 1.1 to 2, and version 1 to 2. The application update provisioning system may store a version reference for the latest personalized version for each account stored in the account information so the system knows for any upgrade or migration what personalization version to update from.

Additionally, in some embodiments, the mobile application update provisioning computer 130 may be operated by and/or integral with a payment processing network (e.g., Visa™, MasterCard™, etc.) to provide provisioning services to merchants, consumers, issuers, mobile devices, etc., associated with payment credentials that are configured to be processed through the payment processing network. More details regarding trusted service managers and a payment processing network provisioning computer may be found in U.S. patent application Ser. No. 13/713,938, filed Dec. 13, 2012, which is incorporated by reference herein in its entirety for all purposes.

A payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet.

Further, in some embodiments, the payment processing network may comprise a token vault or may be configured to communicate with a token vault system (not shown) that issues tokens (e.g., an account substitute) associated with a payment account configured to be processed by the payment processing network. The token vault may issue tokens, store relationships between the tokens and the underlying consumer account associated with the tokens, and may be configured to communicate and process token related requests from a variety of entities within a transaction processing ecosystem.

An applet information issuer computer 140 can be any entity that issues information that may be securely stored in a mobile application. For example, for a mobile payment application, the applet information issuer computer may include a financial institution/bank that issues and maintains a financial account for a user. The financial account issuer may then authorize transactions initiated using the credentials and/or other payment information stored in an applet of the mobile payment application. For secure access mobile applications, the application information issuer may include a security bureau or other credential issuer that may authenticate access rights during a secure access transaction. As another example, the applet information issuer may issue credentials for access to ticketed events, secure buildings, etc. Additionally, the applet information issuer computer may issue information for any other suitable application that may store and use secure data on a communication device that may be validated or authenticated during a transaction.

Further details regarding provisioning systems in general including further explanations regarding trusted service managers, integrated trusted service managers, secure elements, etc., and any components, sub-systems, capabilities, or other systems, may be found in U.S. patent application Ser. No. 13/713,938, filed Dec. 13, 2012, and U.S. patent application Ser. No. 14/455,600, filed Aug. 8, 2014, which are both hereby incorporated by reference, in their entirety, for all purposes. Additionally, details regarding the authentication components, sub-systems, capabilities, or other enhanced authentication systems, may be found in U.S. patent application Ser. No. 12/613,395, filed Nov. 5, 2009, which is hereby incorporated by reference, in its entirety, for all purposes.

Figure 2:
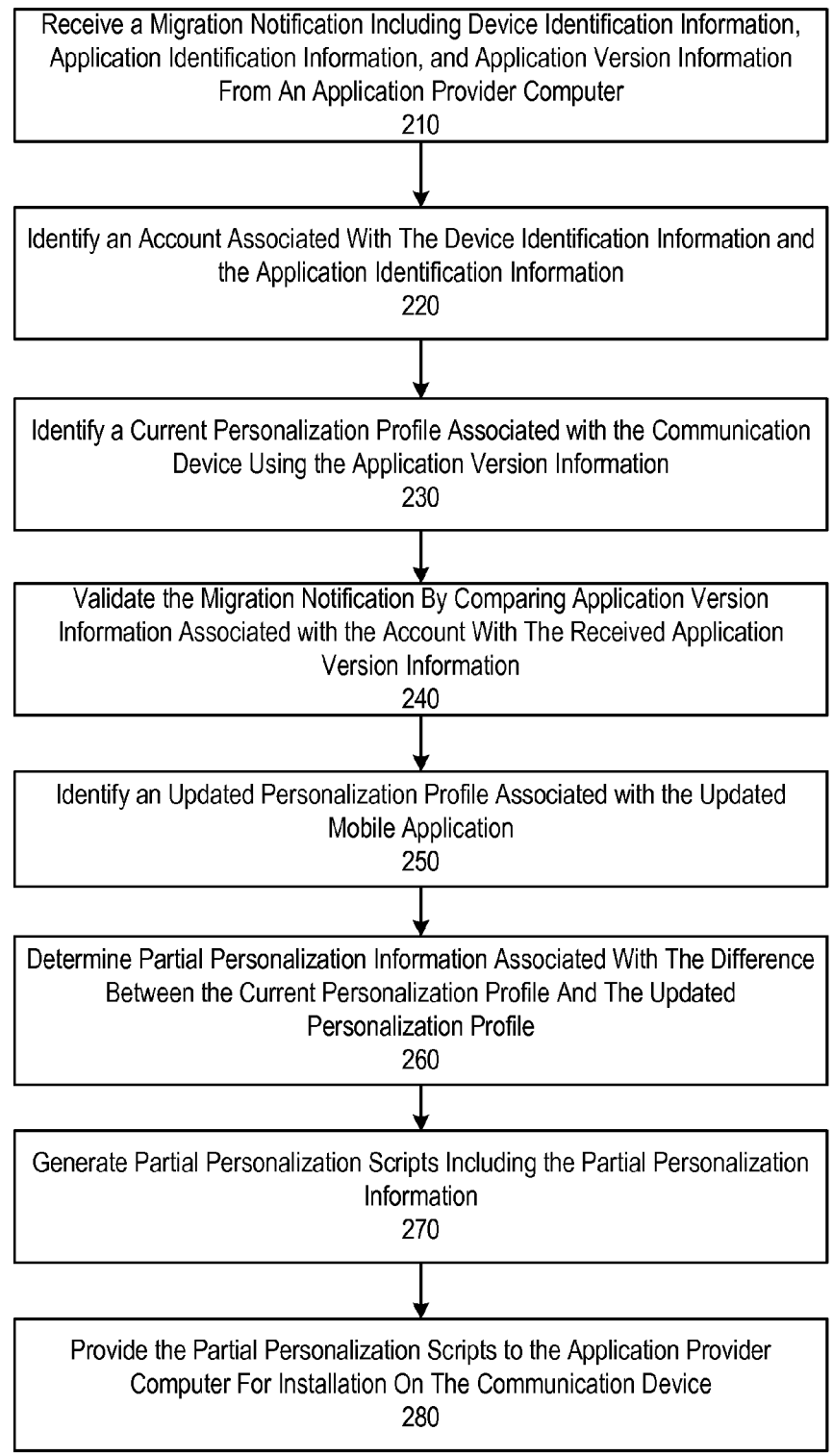
FIG. 2 shows an exemplary flow diagram for a partial personalization provisioning process, according to another embodiment of the present invention.

II. Exemplary Methods for Partial Personalization During Mobile Application Update FIG. 2 shows an exemplary flow diagram for a partial personalization provisioning process, according to another embodiment of the present invention. Before the process shown in FIG. 2 is started, a mobile application present on a communication device may be updated to include new functionality, data storage, and/or may have a security update applied. Once the application is updated, a migration notification may be generated by the mobile application, master application 113, and/or master application provider. The migration notification may be sent to a mobile application update provisioning computer 130 which identifies what personalization data needs to be updated in response to the application update, generates the provisioning scripts for the partial personalization update, and delivers the partial personalization scripts for installation on the device.

At step 210, the application identification module 131 of the application update provisioning computer receives a migration notification from the application provider computer in response to an update event. The migration notification may include device identification information (e.g., a secure element identifier, a mobile subscriber identifier (MSID), etc.), applet identification information (e.g., a registered application identifier (AID) associated with a particular applet), and application version information for a mobile application installed on the communication device. The application version information may include any alphanumeric code or other information that may indicate a previous version of the mobile application installed on the communication device and/or a new updated version of the updated mobile application.

The applet identification information (also referred to as "application identification information") may include any identifier that identifies the applet and/or the mobile application associated with the applet that is the subject of the partial personalization process. For example, the applet identification information may include identifiers for both the mobile application (i.e., mobile application identifier) and the applet associated with the mobile application (e.g., a mobile payment application identifier (AID)). In some embodiments, the applet identification information may include a single identifier that identifies both the mobile application and the applet identifier. In other embodiments, the applet identification information may include separate identifiers for the mobile application and the applet. Any registered and/or identifiable application identifiers may be included in the applet identification information to identify the mobile application and/or applet. The mobile application identifier may be issued by the provisioning system, a payment processing network, a master application provider (e.g., wallet application provider), an applet issuer, and/or any other entities within the mobile payment ecosystem.

At step 220, the application identification module 131 of the mobile application update provisioning computer 130 identifies an account associated with the device identification information and the applet identification information. For example, the application identification module 131 may query a device information database 135 and/or an account information database 136 for an account associated with the received AID and secure element identifier from the migration notification. Any other types of device identifiers and application identifiers may be used to identify an account. In some embodiments, a communication device may have multiple applets installed on the mobile application that are associated with multiple accounts at the mobile application update provisioning computer. Further, in some embodiments, application identifiers may be standardized across multiple different communication devices (e.g., every mobile application that has an account provisioned with a particular type of card or card issuer may have the same application identifier). Accordingly, both the device identification information and the applet identification information may be used to identify the appropriate account associated with the migration notification.

At step 230, the partial personalization script generation module of the mobile application update provisioning computer 130 identifies a current personalization profile associated with the communication device using the device identification information and the applet identification information. For example, the provisioning system determines a current personalization profile associated with the mobile application version information indicating the previous version of the mobile application that was installed on the communication device. Accordingly, using the example provided above, the provisioning system may be determine the previous mobile application personalized on the communication device was version 1.0. Accordingly, the provisioning system may determine the personalization profile associated with version 1.0.

At step 240, the update request validation module 132 of the mobile application update provisioning computer 130 validates the authenticity of the migration notification by comparing a stored application version of the personalization profile of the mobile application with the received application version information. If the versions do not match or if other information included in the version information (e.g., date of update, time of update, version updated previously, etc.) does not match the account and/or device records associated with the device and/or account information of the migration notification, the partial personalization process may be stopped. Such inconsistencies could indicate a man in the middle or other unauthorized request for personalization information. Due to the sensitivity of personalization information, validation of migration notifications may increase the security of the mobile application personalization system.

At step 250, the partial personalization script generation module of the mobile application update provisioning computer 130 identifies an updated personalization profile associated with the updated mobile application on the communication device. In some embodiments, the provisioning system may determine the updated personalization profile using the mobile application version information indicating a version of the updated mobile application that has been installed on the communication device. Accordingly, using the example provided above, the provisioning system may be determine from the application version information that the updated mobile application migrated to the communication device is version 2.0. Accordingly, the provisioning system may determine the personalization profile associated with version 2.0. However, in some embodiments, only a most recently updated application version is available for partial personalization and the updated application version information may not be included in the migration notification because the updated version may already be known by the system.

At step 260, the partial personalization script generation module of the mobile application update provisioning computer 130 determines partial personalization information associated with a difference between the current personalization profile and the updated personalization profile. Accordingly, using the example provided above, the provisioning system may be determine the partial personalization information associated with the difference between the personalization profiles of version 1.0 and 2.0 of the mobile application.

Additionally and/or alternatively, in some embodiments, a partial personalization profile may be generated for each personalization update that includes the personalization differences between each of the mobile application versions and the personalization data that may be necessary to update between versions 1.0 and 2.0. Thus, different profiles may not be compared and instead the differences may be identified by finding the partial personalization profile associated with the difference in the prior installed version and the updated version of the mobile application.

At step 270, the partial personalization script generation module of the mobile application update provisioning computer 130 generates partial personalization scripts including the partial personalization information for updating the personalization information stored in the mobile application of the communication device. Accordingly, the provisioning system generates the scripts including any account or personal information associated with the consumer's account and in some embodiments may interface with an issuer to obtain this information at this point. Alternatively or additionally, the provisioning system may obtain this information from a consumer account database or on-behalf-of the issuer. Further, note that the cryptographic information and other related information that was determined through the secure channel connection with the communication device may be used to generate the correct scripts using the correct cryptographic keys at this point.

At step 280, the provisioning module 134 of the mobile application update provisioning computer 130 provides the partial personalization scripts to a master application provider for installation on the communication device. The provisioning system may provide the partial personalization scripts through multiple manners. For example, in some embodiments, the partial personalization scripts may be transmitted to a master application provider computer which passes the scripts to a master application 113 for installation on the mobile application. In some embodiments, a mobile gateway (not shown) may interface directly with the device for installation of the scripts on the specific data fields using a secure channel configured through a similar process as described herein.

Thereafter, the master application provider computer transmits the partial personalization scripts to the communication device. The mobile application of the communication device then updates the personalization information associated with an applet of the updated mobile application.

Figure 3:
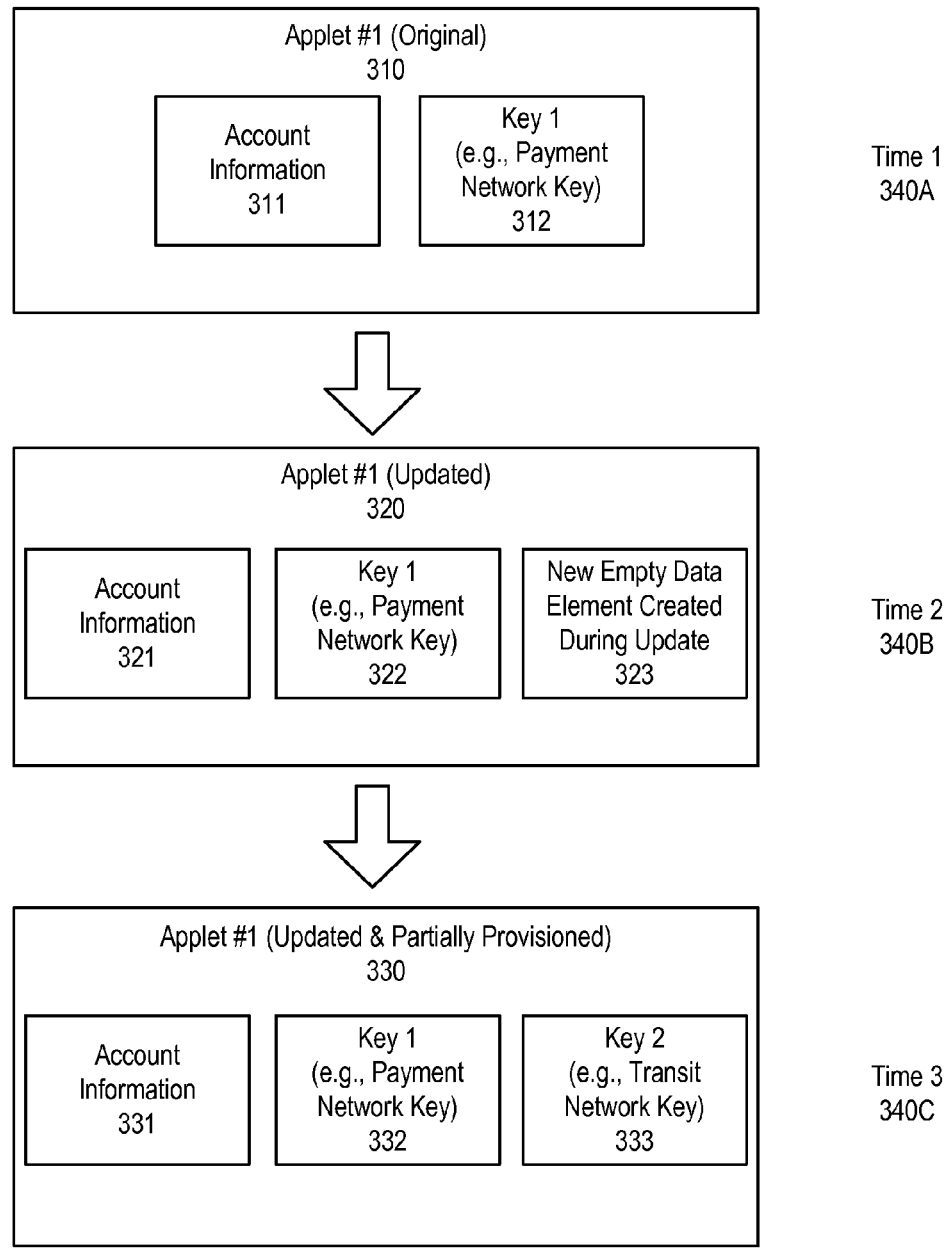
FIG. 3 shows an exemplary block diagram of an application update and partial provisioning process at multiple times including before application update, after application update, and after partial personalization of a mobile application.

FIG. 3 shows an exemplary block diagram of an application update and partial provisioning process at multiple times including before application update 310, after application update 320, and after partial personalization of a mobile application 330.

An example of a provisioned and personalized applet 310 of a mobile application (not shown) at a first time 340A is shown in FIG. 3. The applet 310 has been provisioned into a mobile application (not shown) and personalized with account information 311 and a first encryption key 312 associated with an account.

However, when the applet is updated as part of an applet update or a mobile application update, some new personalization information may be necessary to enable new functionality for the mobile application. For instance, as shown by the updated applet 320 in FIG. 3 at Time 2 340B, the applet 320 has been updated to include new functionality and includes a new data element 323 that has been created during the application update. The data element 323 is empty but the applet is configured to store new data in the newly created data element 323. However, the existing information from the previously provisioned and personalized version of the applet has been saved (imported from a temporary data storage element of the mobile application and/or master application). Accordingly, a re-personalization of the existing information that has not changed with the mobile application update is not required for the mobile application to operate.

At a later Time 3 340C, the applet 330 is shown after being both updated and partially provisioned (according to embodiments described herein) to include a second encryption key 333 in the previously created empty data element. Accordingly, the functionality associated with the updated mobile application may now be activated for the mobile application (not shown). For example, a transit key may be personalized into the applet and transit network functionality of the mobile application (not shown) may now be activated for the applet 330. Accordingly, data processing, transmission, and installation resources of the mobile application have been saved by tailoring the amount of data that is required to be updated for each personalization process related to application updates.

Depending on the configuration details of the mobile application, master application 113, master application provider, and the application update provisioning system, different types of information may be obtained by the master application 113 to initiate the partial provisioning process. For example, FIGS. 4-5 show two different processes for obtaining the requisite information for performing the partial personalization processes. In a first embodiment (shown in FIG. 4), provisioning keys that are stored at the provisioning computer are used to generate the personalization scripts on the communication device. Alternatively and/or additionally, in a second embodiment (shown in FIG. 5), the provisioning computer may use cryptographic keys located in the mobile application to obtain cryptographic keys for generating the partial personalization script. In this embodiment, the provisioning system may need session key information from the mobile application to generate a secure channel in order to securely obtain a key from the mobile application for use in generating the personalization scripts. Each of these embodiments is described in more detail below.

A. Methods Using Stored Provisioning Keys at the Update Provisioning Computer

As explained above, there are multiple different methods for obtaining the requisite information for provisioning partial provisioning scripts on a communication device. In a first embodiment (shown in FIG. 4), the information that may be obtained includes an application identifier (e.g., AID) of an applet that is updated, device information that may be used to identify cryptographic information for generating the appropriate scripts and/or identifying the device (e.g., a secure element identifier, a trusted execution environment identifier, etc.), and a mobile application version identifier (e.g., version number).

Accordingly, the master application 113 may be configured to communicate with the master application provider computer or the application update provisioning system directly to provide the requisite information and allow for partial personalization of the updated mobile application. A migration notification message API or partial personalization request may be sent to the master application provider and subsequently to the mobile application update provisioning system 130. The migration notification message may inform the provisioning system 130 that the mobile application 115 has been updated and that partial personalization should be performed for the identified applet and/or applets.

In this embodiment, a provisioning key may be used to generate the partial personalization scripts such that account and device information may be obtained by receiving secure domain information of the trusted execution environment. The secure domain information may include, for example, a secure element identifier and an application identifier (AID) which identifies the applet, corresponding account information, and provisioning key at the provisioning system for updating the personalization information. The application update provisioning computer may store a provisioning key associated with the secure domain and may be capable of generating the provisioning scripts using the stored provisioning key.

FIG. 4 shows another exemplary flow diagram for a partial personalization provisioning process using secure element information to perform partial personalization, according to another embodiment of the present invention. Note that for the example provided in FIGS. 4-5, the mobile application may also be referred to as a mobile payment application where each applet of the mobile payment application includes payment credentials for one or more accounts as well as other transaction information for performing payment transactions using the communication device, a master application 113 may be referred to as a wallet application that controls access to the mobile payment application, and the applet information issuer computer may be referred to as a financial account issuer computer (e.g., a credit card issuer). However, this is merely one example of the type of applications that may be used with embodiments of the present invention. For example, in other embodiments, the mobile application may be a security access application where the applets include security credentials for authenticating a user to a building access system or other secure area entry. Further, the master application 113 may include a credential authentication provider that manages several different access rights credential applications and manages access to the security applications on the device.

At step 401, an update to a mobile application may be delivered by a master application provider to a master application 113 on a mobile device. The master application provider may obtain the mobile application update code from a mobile application provider, an applet information issuer computer, a payment processing network, and/or any other interested parties to the mobile payment eco-system.

At step 402, the master application 113 and/or the mobile application may receive the application update and the mobile application may be updated. Before updating one or more applets of the mobile application, the mobile application may store the previously personalized information in a temporary memory such that the personalization information is not deleted during installation of the updated mobile application. However, the update may change the mobile application such that new functionality is present on the mobile application and/or such that new personalization information is necessary for new functionality or existing functionality of the mobile application can be used.

At step 403, an migration notification message is sent from the updated mobile application to the master application. As discussed previously, the migration notification message may include secure domain information that includes information for identify the device, the account, and to generate the partial personalization scripts by the provisioning system.

For example, the migration notification message may include (1) the application identifier (e.g., AID) for the mobile application that identifies the applet being updated on the communication device, (2) device identification information to allow the provisioning system to identify a provisioning key to use in generating the provisioning script, and (3) mobile application version information. The information may be provided in a single notification or the information may be obtained over multiple notification messages sent between the communication device and the application update provisioning system. Additionally, where multiple applets are updated in the mobile application, either multiple migration notifications or a single notification including multiple application identifiers associated with the various applets may be provided to the master application 113.

At step 404, the master application forwards the migration notification message including the device identifier, the application identifier, and the version information to the master application provider computer.

At step 405, the master application provider computer determines and forwards the migration notification message including the device identifier, the application identifier, and the version information to the mobile application update provisioning system 130. The master application provider computer 120 may also include other information with the migration notification to assist in completing the partial personalization process. For example, a master application identifier (e.g., a master application identifier) and a request reference identifier may be included in messages between the master application provider and the mobile application update provisioning computer 130 to identify and track a request through the transaction flow. The request identifier may allow each of the systems to track the progress and identity the various parties and corresponding requests through the partial personalization processing operations.

At step 406, the provisioning system receives the migration notification message (also referred to as a migration notification) from the communication device. The migration or migration notification may include the mobile application version information and applet identification information for a mobile application installed on the communication device. As described above, the migration notification may include (1) the AID for the mobile application identifying a particular applet, (2) device identifier for determine the secure element and/or other provisioning key associated with the device, and (3) mobile application version number such that the provisioning system may generate the partial personalization scripts for provisioning on the communication device.

At steps 406-412, the application identification module 131 of the provisioning system may determine the account and the device associated with the migration notification and may proceed with the partial personalization process as described above in reference to FIG. 2 at steps 210-280. Because the provisioning system has a stored provisioning key for generating the partial personalization scripts for installation in the mobile application on the trusted execution environment of the communication device, the provisioning system has or can determine all of the requisite information for generating the partial personalization scripts associated with the migration event.

Furthermore, in some embodiments, an applet information issuer computer may be contacted in order to obtain personalization information for updating the mobile application after the different types of partial personalization information for the partial personalization process are identified. In such embodiments, the applet information issuer computer may store the relevant personalization information that may be not be available to the mobile application update provisioning computer 130 and the personalization information may be obtained from the applet information issuer so that the partial personalization scripts may be generated. Further, in some embodiments, the functionality of the mobile application update provisioning computer 130 may be incorporated into an issuer system such that the issuer may perform the partial personalization profile determination and script generation.

At step 413-414, the partial personalization script is transmitted to the master application 113 through the master application computer. The partial personalization script may be transmitted with a task reference identifier, device identification information, application identifier (e.g., AID), secure domain information of the trusted execution environment (e.g., supplementary secure domain identifier), and any other information to allow the master application provider computer to identify the communication device associated with the personalization scripts.

At step 415, the master application 113 receives the partial personalization scripts and commands the mobile application to install the partial personalization scripts on the identified applet of the mobile application within the partial personalization script. Thus, the partial personalization script command may include an application identifier associated with the applet (and/or applets) being personalized.

At step 416, the mobile application installs the partial personalization script into the applet identified by the partial personalization script command.

At steps 417-419, the partial personalization scripts are installed on the mobile device and confirmation is received and passed to the provisioning system through the master application 113 and master application provider computer. In some embodiments, an issuer may be notified by any of the entities as well.

B. Methods Using Encryption Keys Present on the Mobile Device

Additionally, some embodiments may use cryptographic keys located in the mobile application to prepare the mobile application for update and install personalization script updates. In this embodiment, the provisioning system may need the version number of the mobile application, the application identifier, and a mobile application identifier (MAID) that allows for the application update provisioning system to identify and securely communicate with the mobile application to obtain cryptographic key information for validation before generating scripts altering data on a mobile application. The verification entity may then generate the partial personalization scripts for updating the personalization information present in the applet.

In such embodiments, the provisioning system may use a mobile application identifier (MAID) and other information received from the mobile application in the migration notification (or requested after receiving the notification message) to generate a session key for communicating with the mobile application. The provisioning system may use the session key to prepare a secure channel with the mobile application. The secure channel may be used in order to securely communicate with the mobile application and to obtain secure information from the mobile application in order to validate and personalize an applet of the mobile application using a secure domain key associated with the mobile application. The provisioning system may then use the encryption key to update the present personalization information in the updated mobile application as needed. In some embodiments, dynamic data (e.g., a transaction sequence counter) may also be provided in the migration notification in order to derive the session key for communicating with the mobile application.

In this embodiment, the received key from the mobile application may be used to update the data stored in the mobile application through a piece-meal process of changing each data element in the mobile application. So a mobile application may create a default value for each new personalization element during an application update and then each default value may be updated using a data update script instead of a provisioning script.

FIG. 5 shows one exemplary flow diagram for a partial personalization provisioning process using a key stored by the mobile application, according to embodiments of the present invention.

At step 501-504, the mobile application is updated, the previous personalization data is imported into the updated mobile application, and a migration notification is generated and sent to master application 113 for delivery to the provisioning system. The migration notification may include any information to allow the provisioning system to identify the account and device associated with the migration. For example, the migration notification may include an application identifier (AID) for an applet of the mobile application associated with the update and a device identifier (e.g., a secure element identifier, device serial number, etc.) to determine the communication device associated with the migration notification. The notification may also include any event information or codes to indicate the type of update or event being reported. Furthermore, the migration notification may include the version of the mobile application that has been updated (i.e., mobile application version information) as well as, in some embodiments, the previous version of the mobile application that is being updated from.

At step 505, the provisioning system 130 may determine the device associated with the notification event and may generate a secure channel key identification request to obtain the requisite key identification data to determine a session key for securely communicating with the mobile application. The provisioning system may send the request to the master application of the mobile device through the master application provider computer. Note that although some of the communication lines appear to go through the master application provider computer, the master application provider computer may receive the request and forward the request to the appropriate computer or communication device as appropriate. In some embodiments, the devices may communicate directly as well.

At step 505, the provisioning system receives the application information (e.g., MAID and MSC) and prepares and establishes a secure channel to communicate with the mobile application. The secure channel may be established using the mobile application information received from the master application through the master application provider in response to the get data request.

At step 506, the provisioning system 130 generates a request for mobile status update (MSU) data in order to obtain cryptographic data from the mobile application to validate an applet before personalization. The request for mobile status update data may include an application identifier (AID) for the applet in which the provisioning system may desire information regarding. The MSU data may also be referred to as "validation information" because the response from the mobile application may be used to validate that the mobile application is prepared for a mobile update including installation of partial personalization scripts and that the mobile application is authentic and valid.

At step 507, the master application 113 receives the request (through the mobile application provider computer) and instructs the mobile application to prepare for an update to the personalization information. Additionally, the master application 113 instructs the mobile application as to which secure domain (SSD) and personalized application may be updated using an application identifier (AID) associated with the applet. A number of authentication processes and data preparation steps may be accomplished to prepare the mobile application for the data updates. In some embodiments, the preparation of the applet of the mobile application for update may include the selection of an application identifier, an initialization for an update message, an external authentication process, and a store data message being sent to the mobile application. Further, the process may include a get data request to obtain country code information which the mobile application may then access the identified applet and return an issuer country code for the applet information.

At step 508, the master application 113 requests mobile status update (MSU) data associated with an identified applet of the mobile application. The mobile status update (MSU) data may include the requisite data to validate that the mobile application is authentic and allow a partial personalization script to be generated and installed on the mobile application. The cryptographic information obtained from the MSU data request may include cryptographic information, a counter, a cryptogram, and any other information that may be used during script generation to ensure the security of the applet update. This information may be called mobile application information and may be sufficient to allow for generation of the requisite partial personalization scripts by the provisioning system. The mobile status update data may include, for example, an application transaction counter, issuer application data, transaction information, an application PAN sequence number, a cryptogram, and an application interchange profile.

At step 509, the mobile application responds with encrypted MSU data and provides the MSU data to the master application. The MSU response data may include a mobile sequence counter, the length of the encrypted MSU data, the encrypted MSU data, and a MAC for validating that the message is not intercepted or altered. The encrypted MSU data may include an application transaction counter, an amount, a transaction date, a transaction type, a transaction currency code, issuer application data, track 2 equivalent data, an application PAN sequence number, and an application cryptogram. Additionally, the encrypted MSU data may also include mobile application version information indicating the version of the mobile application. In some embodiments, the version information may be provided as a separate data element outside of the encrypted MSU data.

At step 510, the master application 113 sends the MSU response to the provisioning system including the encrypted MSU data. The master application 113 and/or the master application provider may add a request identifier, a master application identifier, and any other relevant information for performing the partial personalization.

At step 511, the provisioning computer receives the encrypted MSU data response and validates the MAC to ensure the message was not altered. The provisioning computer may use the session key of the secure channel to decrypt the MSU data. In some embodiments, the provisioning computer may use a separate key associated with the communication device and/or mobile application to decrypt the MSU data.

At step 512, the application update provisioning system determines the relevant account and device information associated with the partial personalization request and submits the MSU data to an issuer to validate the MSU data. In some embodiments, the provisioning system may also have access to the account information to validate the account information on behalf of the issuer.

At step 513, the applet information issuer computer may validate the MSU data and may validate the account information associated with the MSU data. Before, during, or after sending the request for account verification, the provisioning system may determine the partial personalization information to personalize into in the mobile application.

At steps 514-516, similar steps are performed as described above in reference to steps 230, 250, and 260 of FIG. 2. However, once the provisioning system has identified the partial personalization information to include in a partial personalization script, the provisioning system may forward an indication of the partial personalization information to the applet information issuer for preparation of the partial personalization scripts. Note that in some embodiments, these steps may be performed before sending the account information for verification and the partial personalization information may be included as part of the request for partial personalization.

At step 517, the applet information issuer computer generates partial personalization scripts including the determined partial personalization information for updating the personalization information stored on the communication device. Alternatively or additionally, the provisioning system may obtain this information from a consumer account database or on-behalf-of the issuer. The partial personalization scripts are then returned to the provisioning computer for delivery to the communication device through the master application provider.

At step 518, the provisioning system transmits the partial personalization scripts for installation on the communication device. The scripts may be passed through the mobile application provider computer with the scripts formulated to affect particular fields within the mobile application.

At steps 519-521, the partial personalization script updates are installed on the mobile device and confirmation is received and passed to the provisioning system. In some embodiments, the applet information issuer may be notified by any of the entities as well.

Additionally, in some embodiments, the initiation of the application update and partial personalization process on the communication device may be different than those methods shown in FIGS. 4 and 5. For example, in some embodiments the update may be initiated after an event triggers a notification to be sent to the master application and/or provisioning system. For example, such a process may begin by the mobile application notifying the master application that an event has occurred on the mobile application (e.g., a security notification) and that an application update is requested. The application update request may be transmitted to the master application provider computer which may initiate the software update of the mobile application and a migration notification may be initiated by the mobile application once update of the mobile application is complete.

Additionally, in some embodiments, an application information issuer may request a mobile application update which may start the update process and the partial personalization process described herein. For example, an issuer may desire to provide an application update to the mobile application for an applet in the mobile application. Thus, the issuer request may include account identification information for an applet stored on the mobile application and the mobile application update may be pushed to the master application provider for installation on the communication device by the issuer and/or by the provisioning computer. The process may then proceed as described herein.

Furthermore, in some embodiments, a single message including the MSU data may be provided in response to a mobile application update. Thus, the steps 503-510 may be combined into a single message that provides all of the information necessary for the partial personalization process. In such embodiments, before the personalization update is requested or the mobile application is updated, the master application 113 may communicate an encryption key to the provisioning system which may store the key for future use in partial personalization and application update processes. Thus, the master application 113 may obtain data from the mobile application 115 and include it in the migration notification that will allow the system to determine the correct secure element data and/or cryptographic information for updating the mobile application 115 without generating a secure channel and obtaining the key for each partial personalization of the mobile application.

Note that more than one applet may be personalized at a time by including multiple versions of the information in the migration notification and the process is the same with multiple personalization scripts being generated and delivered to the communication device.

A server computer can be a powerful computer or a cluster of computers. For example, the server computer can be a large mainframe, a minicomputer cluster, or a group of servers functioning as a unit. In one example, the server computer may be a database server coupled to a Web server.

A consumer or user may be any person using a mobile device during a transaction with a merchant or using the mobile device to provision the device to be used with merchants, access devices, or any other types of transactions.

The various participants and elements described herein may operate one or more computer apparatuses to facilitate the functions described herein. Any of the elements in the above-described FIGS. 1-5, including any servers or databases, may use any suitable number of subsystems to facilitate the functions described herein.

Examples of such subsystems or components may include a central processor, input/output controller, system memory, printer, display adapter and monitor, serial port, keyboard, fixed disk, and external interface interconnected via a system bus. Subsystems such as a printer, keyboard, fixed disk (or other memory comprising computer readable media), and monitor which is coupled to a display adapter. Peripherals and input/output (I/O) devices, which couple to I/O controller (which can be a processor or other suitable controller), can be connected to the computer system by any number of means known in the art, such as serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for updating personalization information associated with an update of a mobile application on a communication device managed by an application provider computer, the method comprising:
   receiving, by a server computer, a migration notification from the application provider computer, the migration notification including device identification information, applet identification information identifying an applet of the mobile application, and application version information for the mobile application installed on the communication device by the application provider computer;
   identifying, by the server computer, an account associated with the migration notification using the device identification information and the applet identification information;
   validating, by the server computer, the migration notification by comparing the received application version information with stored application version information associated with the identified account;
   identifying, by the server computer, a current personalization profile associated with the mobile application using the received application version information;
   identifying, by the server computer, an updated personalization profile associated with the update of the mobile application;
   determining, by the server computer, partial personalization information associated with a difference between the current personalization profile and the updated personalization profile;
   generating partial personalization scripts including the partial personalization information for updating the personalization information stored in the mobile application of the communication device, the partial personalization scripts generated without including duplicate personalization information for the applet that is the same across the update of the mobile application and a previous version of the mobile application installed on the communication device, wherein the duplicate personalization information is retained at the communication device during update of the personalization information; and
   providing, by the server computer, the partial personalization scripts to the application provider computer for installation on the communication device to update the personalization information of the applet identified by the applet identification information.

2. The method of claim 1, wherein the partial personalization information includes at least one of an encryption key, a credential, a shared secret, and user information.

3. The method of claim 1, wherein the application version information indicates the previous version of the mobile application installed on the communication device.

4. The method of claim 1, wherein the mobile application is in an inactive state until the partial personalization scripts are installed on the communication device.

5. The method of claim 1, wherein updated functionality associated with the update of the mobile application is disabled until the partial personalization scripts are installed on the communication device.

6. The method of claim 1, wherein receiving the migration notification from the communication device further comprises:
   establishing, by the server computer, a secure channel with the communication device using the applet identification information and the device identification information;
   sending, by the server computer, a mobile status update command preparing the mobile application for the update;
   receiving, by the server computer, validation information from the mobile application of the communication device through the secure channel; and
   validating, by the server computer, the validation information to authenticate the mobile application.

7. The method of claim 1, wherein the migration notification is generated by the mobile application in response to an event associated with the mobile application.

8. The method of claim 1, wherein the generation of the partial provisioning scripts is performed by an issuer computer.

9. The method of claim 1, wherein an issuer may request an update of the mobile application on the communication device before the migration notification is received.

10. A server computer comprising:
    a processor; and
    a computer-readable medium coupled to the processor, the computer-readable medium comprising code, executable by the processor, to perform a method for updating personalization information associated with an update of a mobile application on a communication device, the method comprising:
      receiving a migration notification from the application provider computer, the migration notification including device identification information, applet identification information identifying an applet of the mobile application, and application version information for the mobile application installed on the communication device by the application provider computer;
      identifying an account associated with the migration notification using the device identification information and the applet identification information;
      validating the migration notification by comparing the received application version information with stored application version information associated with the identified account;

identifying a current personalization profile associated with the mobile application using the received application version information;
identifying an updated personalization profile associated with the update of the mobile application;
determining partial personalization information associated with a difference between the current personalization profile and the updated personalization profile;
generating partial personalization scripts including the partial personalization information for updating the personalization information stored in the mobile application of the communication device, the partial personalization scripts generated without including duplicate personalization information for the applet that is the same across the update of the mobile application and a previous version of the mobile application installed on the communication device, wherein the duplicate personalization information is retained at the communication device during update of the personalization information; and
providing the partial personalization scripts to the application provider computer for installation on the communication device to update the personalization information of the applet identified by the applet identification information.

11. The server computer of claim 10, wherein the partial personalization information includes at least one of an encryption key, a credential, a shared secret, and user information.

12. The server computer of claim 10, wherein the application version information indicates the previous version of the mobile application installed on the communication device.

13. The server computer of claim 10, wherein the mobile application is in an inactive state until the partial personalization scripts are installed on the communication device.

14. The server computer of claim 10, wherein updated functionality associated with the update of the mobile application is disabled until the partial personalization scripts are installed on the communication device.

15. The server computer of claim 10, wherein receiving the migration notification from the communication device further comprises:
establishing a secure channel with the communication device using the mobile application information and the device identification information;
sending a mobile status update command preparing the mobile application for the update;
receiving validation information from the mobile application of the communication device through the secure channel; and
validating the validation information to authenticate the mobile application.

16. The server computer of claim 10, wherein the migration notification is generated by the mobile application in response to an event associated with the mobile application.

17. The server computer of claim 10, wherein the generation of the partial provisioning scripts is performed by an issuer computer.

18. A system comprising:
a communication device including a master mobile application configured to:
send a migration notification in response to an update event, the migration notification including device identification information, applet identification information identifying an applet of a mobile application, and application version information of the mobile application to an application provider computer;
the application provider computer configured to:
receive the migration notification;
determine a provisioning computer associated with the mobile application;
transmit the migration notification to the provisioning computer;
receive partial personalization scripts from the provisioning computer; and
provide the partial personalization scripts to the master mobile application for installation on the communication device to update the personalization information of the applet identified by the applet identification information; and
the provisioning computer configured to:
receive the migration notification from the application provider computer;
identify a current personalization profile associated with the communication device using the device identification information and the applet identification information;
identify an account associated with the migration notification using the device identification information and the applet identification information;
validate the migration notification by comparing the received application version information with stored application version information associated with the identified account;
identify a current personalization profile associated with the mobile application using the received application version information:
identify an updated personalization profile associated with an update of the mobile application on the communication device;
determine partial personalization information associated with a difference between the current personalization profile and the updated personalization profile;
generate the partial personalization scripts including the partial personalization information for updating the personalization information stored in the mobile application of the communication device, the partial personalization scripts generated without including duplicate personalization information for the applet that is the same across the update of the mobile application and a previous version of the mobile application installed on the communication device, wherein the duplicate personalization information is retained at the communication device during update of the personalization information; and
provide the partial personalization scripts to the application provider computer.

* * * * *